United States Patent [19]
Cavicchi

[11] 3,779,106
[45] Dec. 18, 1973

[54] WHEEL WRENCH ADAPTER
[76] Inventor: Roland Cavicchi, 118 Phipps St., Quincy, Mass.
[22] Filed: Apr. 24, 1972
[21] Appl. No.: 246,553

[52] U.S. Cl................................. 81/177 B, 7/1 E
[51] Int. Cl.............................. B25b 13/00
[58] Field of Search............... 81/177 R, 177 A, 81/177 E, 177 B, 180 R, 184; 7/1 E, 12

[56] References Cited
UNITED STATES PATENTS
2,212,716   8/1940   Noble et al.............................. 7/1 E FOREIGN PATENTS OR APPLICATIONS
1,084,267   7/1954   France .............................. 81/177 B Primary Examiner—Donald G. Kelly
Assistant Examiner—James G. Smith
Attorney—Robert R. Churchill

[57] ABSTRACT

This invention consists in an adapter for use in connection with an automobile wheel tire wrench to enable the wheel nuts to be easily removed when changing a tire.

5 Claims, 3 Drawing Figures

PATENTED DEC 18 1973  3,779,106

WHEEL WRENCH ADAPTER

BACKGROUND OF THE INVENTION

The invention resides in the field of wrenches for removing the wheels from automobiles and replacing them for changing a tire.

DESCRIPTION OF THE PRIOR ART

Prior to the present invention, there have been various types of so-called "wheel wrenches" on the market for use in changing flat tires. The most commonly used wrench, one which is part of the equipment of a new automobile, is a wrench having a hexagonal head and an extended handle. The head portion is positioned at about a 45° angle relative to the remainder of the wrench. The result of this is that when pressure is exerted on the handle with the head engaging the nut, it exerts a shearing force on the bolt and also tends to bind the nut on the bolt. The present device embodies structure which is adapted for use with the substantially L-shaped wrench and changes the direction of the force on the nut, thereby making its removal substantially easier.

SUMMARY OF THE INVENTION

The present invention contemplates a novel and improved adapter for use with an automobile wrench or tire wrench.

The invention relates to a novel and improved structure embodying a holder for the socket end of a tire wrench and a handle arranged to cooperate with the handle of the wrench to enable the nuts on the automobile wheel to be readily removed by directing the force exerted through the wrench and adapter squarely on the nut.

Accordingly, the invention has for a principal object to provide an adapter for a tire wrench which readily cooperates with the wrench to greatly enhance the twisting or unscrewing capability of the wrench for rapidly and easily removing the nuts of a car wheel to change a tire.

Another object of the invention is to provide a structure wherein the force directed on the nut is an even force and not a shearing force.

A still further object is to provide a device which may be easily and quickly assembled and disassembled after use.

With these general objects in view and such others as may hereinafter appear, the invention consists in the adapter and in the structure and arrangement of the parts thereof hereinafter described and particularly defined in the claims at the end of this specification.

BRIEF DESCRIPTION OF THE DRAWINGS

In the drawings illustrating the preferred embodiment of the invention.

DESCRIPTION OF THE PREFERRED EMBODIMENT

Figure 1:
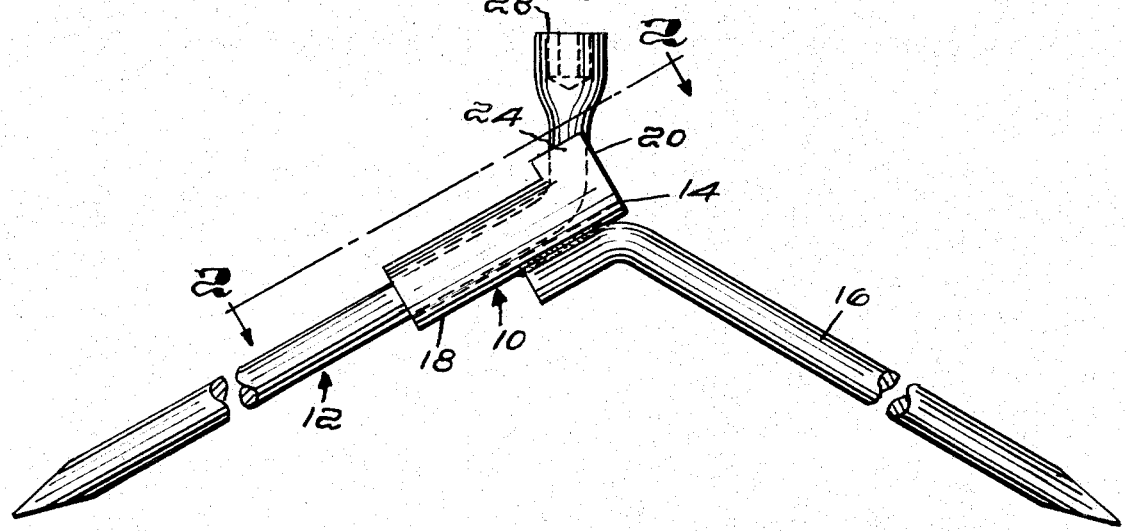
FIG. 1 is a side elevation of the present invention partially broken away.
Figure 2:
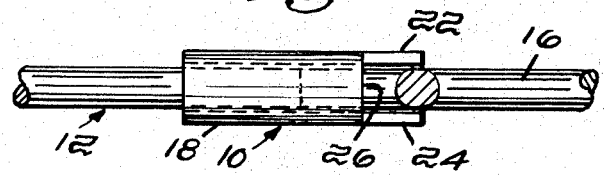
FIG. 2 is a section taken on the line 2—2 of FIG. 1.
Figure 3:
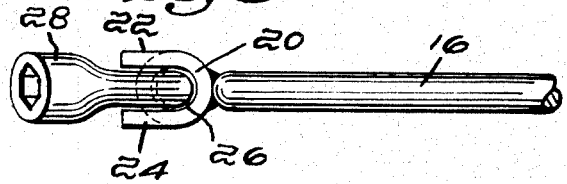
FIG. 3 is a top view of the socket end of the adapter and wrench.

The invention, as illustrated in FIG. 1 of the drawings, comprises an adapter 10 for use with an automobile tire wrench 12. The adapter 10 consists of a hollow cylindrical sleeve portion 14 either made integral with or welded to or by some other means secured to an elongated handle 16. The inside diameter of the sleeve 14 is slightly greater than the diameter of the elongated portion 18 of the wrench 12. The cylindrical portion 14 is open at both ends and a thin cut is made in the upper surface adjacent the end 20. Portions of the sleeve adjacent the slot are turned upwardly to form upstanding flanges 22, 24 and define a slot 26 through which the head end 28 of the wrench extends.

As hereintofore reiterated, the conventional wrench which is accessory equipment on practically all new American manufactured automobiles has the great disadvantage of having an angle between the head or nut-receiving portion and the handle which results in a shearing force being applied to the wheel nuts and lugs when pressure is applied at the end of the handle. This results in either a shearing off of the lugs or makes removal of the nuts very difficult, particularly those being rusted in place or tightened with power wrenches.

The present adapter substantially eliminates these difficulties and disadvantages by converting the wrench 12 from an L-shaped wrench to a Y or T wrench. In doing this, the force upon the wheel nuts is direct and in a plane perpendicular to the axis of the lugs.

In operation, the adapter 10 is positioned with the sleeve 14 facing outwardly as shown in FIG. 1. The end 28 of the wrench 12 is inserted into the slotted end of the adapter and pushed all of the way into the slot so that, as shown, the portion of the wrench adjacent the head or nut-receiving end bears against the flanges 22, 24. In this assembled portion the wrench and adapter are locked together securely. Thus, two handles are provided for the head of the wrench and the force exerted is directed substantially perpendicular to the axis of the nut and lug to which it is applied. The handles are then rotated and the nut quite easily removed.

The device may be easily disassembled and stored for future use.

From the foregoing description it will be apparent that the present adapter converts the standard conventional wheel or tire wrench into a highly efficient wrench which allows even pressure to be exerted on the nut to be removed whereby binding of the nut or shearing of the lug is substantially eliminated.

Having thus defined the invention, what is claimed is:

1. A tool for use in changing automobile tires comprising, in combination, a wheel wrench and an adapter for the wrench, said wrench having a straight handle portion and head portion bent at an angle relatively to the handle, said head portion including a hexagonal socket, and said adapter comprising a handle and a head portion disposed at one end of the handle, said head portion of the adapter being bent at the same angle as that of the wrench and having a hollow body portion open at both ends, a slot in the surface thereof defined by a pair of spaced upstanding flanges, the wrench handle being adapted to fit within the hollow head portion of the adapter with the socket end of the wrench extended outwardly through the slot and bearing against the adapter flanges to prevent its movement and locking the assembly together.

2. A tool as defined in claim 1 wherein the head portion of the adapter is a hollow cylindrical member adapted to receive the handle of the wrench.

3. A tool as defined in claim 1 wherein the upstanding flanges are integral with the body of the adapter head.

4. A tool as defined in claim 1 wherein the wrench and the adapter are each L-shaped.

5. A tool for use in changing automobile wheels comprising an L-shaped member having a hexagonal socket at one end and a handle, and another L-shaped member having a hollow cylindrical head portion and a handle, said first L-shaped member adapted to fit into the cylindrical head portion of the second L-shaped member with the socket extending outwardly from the cylindrical head portion to thereby provide a Y-shaped tool.

* * * * *